(12) United States Patent
Sloane et al.

(10) Patent No.: US 11,620,182 B2
(45) Date of Patent: Apr. 4, 2023

(54) SYSTEM FOR RESOLUTION OF TECHNICAL ISSUES USING COMPUTING SYSTEM-SPECIFIC CONTEXTUAL DATA

(71) Applicant: Bank of America Corporation, Charlotte, NC (US)

(72) Inventors: Brandon Sloane, Santa Barbara, CA (US); Adriana Tache, Falls Church, VA (US)

(73) Assignee: BANK OF AMERICA CORPORATION, Charlotte, NC (US)

(*) Notice: Subject to any disclaimer, the term of this patent is extended or adjusted under 35 U.S.C. 154(b) by 348 days.

(21) Appl. No.: 17/007,185

(22) Filed: Aug. 31, 2020

(65) Prior Publication Data
US 2022/0066860 A1  Mar. 3, 2022

(51) Int. Cl.
| | |
|---|---|
| G06F 11/00 | (2006.01) |
| G06F 11/07 | (2006.01) |
| G06F 16/53 | (2019.01) |
| G06F 21/55 | (2013.01) |
| G06F 16/2458 | (2019.01) |
| G06F 3/0482 | (2013.01) |

(52) U.S. Cl.
CPC ........ *G06F 11/0793* (2013.01); *G06F 11/079* (2013.01); *G06F 11/0751* (2013.01); *G06F 16/2468* (2019.01); *G06F 16/53* (2019.01); *G06F 21/552* (2013.01); *G06F 3/0482* (2013.01); *G06F 2221/034* (2013.01)

(58) Field of Classification Search
CPC ............... G06F 11/0793; G06F 11/079; G06F 11/0751; G06F 11/0709; G06F 11/3058; G06F 11/3082; G06F 11/3466; G06F 11/36
See application file for complete search history.

(56) References Cited

U.S. PATENT DOCUMENTS

| | | | |
|---|---|---|---|
| 8,065,315 B2 | 11/2011 | Rapp et al. | |
| 8,370,362 B2 | 2/2013 | Szabo | |
| 8,468,244 B2 | 6/2013 | Redlich et al. | |
| 8,473,325 B2 | 6/2013 | Barnhill, Jr. et al. | |
| 8,813,125 B2 | 8/2014 | Reisman | |
| 8,843,994 B2 | 9/2014 | Tandon | |
| 9,191,380 B2 | 11/2015 | Anderson et al. | |

(Continued)

*Primary Examiner* — Charles Ehne
(74) *Attorney, Agent, or Firm* — Moore & Van Allen PLLC; Seongun M. Hong (57) ABSTRACT

A system is provided for resolution of technical issues using computing system-specific contextual data. In particular, the system may comprise a software-based automated security agent that may run in the memory of a computing system within a network. The security agent may continuously monitor the computing system to capture precise information about the computing system at all points in time. When the computing system encounters a technical issue, the system may then use the data collected by the security agent to execute a search within a resolution database to provide a solution to the technical issue. In some embodiments, the system may further comprise a remediation engine which may cause the security agent to automatically implement the solution. In this way, the system provides an expedient way to resolve technical issues in computing systems within the network environment.

11 Claims, 2 Drawing Sheets

(56) References Cited

U.S. PATENT DOCUMENTS

| | | | |
|---|---|---|---|
| 9,239,989 B2 | 1/2016 | Bouqata et al. | |
| 9,419,951 B1 | 8/2016 | Felsher et al. | |
| 9,710,122 B1 * | 7/2017 | Pillay | H04L 41/12 |
| 9,794,797 B2 | 10/2017 | Hoffberg | |
| 10,162,693 B1 * | 12/2018 | Contino | G06F 11/0742 |
| 10,229,265 B2 | 3/2019 | Schaefer et al. | |
| 10,303,539 B2 * | 5/2019 | Meng | G06F 21/552 |
| 10,432,721 B2 | 10/2019 | Vermeulen et al. | |
| 10,616,294 B2 | 4/2020 | Shribman et al. | |
| 10,656,724 B2 | 5/2020 | Kramer et al. | |
| 11,210,160 B1 * | 12/2021 | Dukhovny | G06F 11/079 |
| 2015/0188949 A1 | 7/2015 | Mahaffey et al. | |
| 2016/0156509 A1 | 6/2016 | Salim et al. | |
| 2017/0293763 A1 | 10/2017 | Shear et al. | |
| 2017/0344218 A1 | 11/2017 | Jann et al. | |
| 2018/0225584 A1 | 8/2018 | Brown et al. | |
| 2019/0132350 A1 | 5/2019 | Smith et al. | |
| 2019/0245971 A1 | 8/2019 | Dwyer et al. | |
| 2022/0066860 A1 * | 3/2022 | Sloane | G06F 11/0793 |

\* cited by examiner

SYSTEM FOR RESOLUTION OF TECHNICAL ISSUES USING COMPUTING SYSTEM-SPECIFIC CONTEXTUAL DATA

FIELD OF THE INVENTION

The present disclosure embraces a system for resolution of technical issues using computing system-specific contextual data.

BACKGROUND

There is a need for a way to expediently and efficiently provide resolution of technical issues in computing systems.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

A system is provided for resolution of technical issues using computing system-specific contextual data. In particular, the system may comprise a software-based automated security agent that may run in the memory of a computing system within a network. The security agent may continuously monitor the computing system to capture precise information about the computing system at all points in time. When the computing system encounters a technical issue, the system may then use the data collected by the security agent to execute a search within a resolution database to provide a solution to the technical issue. In some embodiments, the system may further comprise a remediation engine which may cause the security agent to automatically implement the solution. In this way, the system provides an expedient way to resolve technical issues in computing systems within the network environment.

Accordingly, embodiments of the present disclosure provide a system for resolution of technical issues using computing system-specific contextual data. The system may comprise a memory device with computer-readable program code stored thereon; a communication device; and a processing device operatively coupled to the memory device and the communication device, wherein the processing device is configured to execute the computer-readable program code to continuously monitor, via a software-based security agent, system-specific data associated with a user computing system; detect, based on the system-specific data, a technical issue within the user computing system; transmit a search query associated with the technical issue to a resolution database system, wherein the search query comprises the system-specific data; receive, from the resolution database system, an ordered list of solutions associated with the technical issue; detect that a solution within the ordered list of solutions comprises executable remediation code associated with the technical issue; and execute the executable remediation code to remediate the technical issue.

In some embodiments, the computer-readable program code further causes the processing device to detect a support request from a user associated with the user computing system; and present a graphical user interface on a display device of the user computing system, wherein the graphical user interface comprises one or more interface elements configured to receive additional input data from the user, the one or more interface elements comprising at least one of an image capture tool and a text entry field, wherein the search query further comprises the additional input data from the user, wherein the additional input data comprises at least one of an image capture and a character search string.

In some embodiments, the resolution database system is configured to perform a fuzzy algorithm-based image search within a resolution database based on the image capture.

In some embodiments, the resolution database system is configured to perform a keyword search within a resolution database based on the character search string.

In some embodiments, the computer-readable program code further causes the processing device to present the ordered list of solutions to a graphical user interface on a display device of the user computing system; and receive a selection of the solution from a user associated with the user computing system, wherein executing the executable remediation code is based on receiving the selection of the solution from the user.

In some embodiments, executing the executable remediation code is performed automatically by the security agent.

In some embodiments, the system-specific data comprises at least one of system alerts, keystrokes, and system state information.

In some embodiments, the technical issue is one of an application error, a software crash, or system instability.

In some embodiments, the technical issue is unauthorized activity on the user computing system.

Embodiments of the present disclosure also provide a computer program product for resolution of technical issues using computing system-specific contextual data. The computer program product may comprise at least one non-transitory computer readable medium having computer-readable program code portions embodied therein, the computer-readable program code portions comprising executable code portions for continuously monitoring, via a software-based security agent, system-specific data associated with a user computing system; detecting, based on the system-specific data, a technical issue within the user computing system; transmitting a search query associated with the technical issue to a resolution database system, wherein the search query comprises the system-specific data; receiving, from the resolution database system, an ordered list of solutions associated with the technical issue; detecting that a solution within the ordered list of solutions comprises executable remediation code associated with the technical issue; and executing the executable remediation code to remediate the technical issue.

In some embodiments, the computer-readable code portions further comprise executable code portions for detecting a support request from a user associated with the user computing system; and presenting a graphical user interface on a display device of the user computing system, wherein the graphical user interface comprises one or more interface elements configured to receive additional input data from the user, the one or more interface elements comprising at least one of an image capture tool and a text entry field, wherein the search query further comprises the additional input data from the user, wherein the additional input data comprises at least one of an image capture and a character search string.

In some embodiments, the resolution database system is configured to perform a fuzzy algorithm-based image search within a resolution database based on the image capture.

In some embodiments, the resolution database system is configured to perform a keyword search within a resolution database based on the character search string.

In some embodiments, the computer-readable code portions further comprise executable code portions for presenting the ordered list of solutions to a graphical user interface on a display device of the user computing system; and receiving a selection of the solution from a user associated with the user computing system, wherein executing the executable remediation code is based on receiving the selection of the solution from the user.

Embodiments of the present disclosure also provide a computer-implemented method for resolution of technical issues using computing system-specific contextual data, wherein the computer-implemented method comprises continuously monitoring, via a software-based security agent, system-specific data associated with a user computing system; detecting, based on the system-specific data, a technical issue within the user computing system; transmitting a search query associated with the technical issue to a resolution database system, wherein the search query comprises the system-specific data; receiving, from the resolution database system, an ordered list of solutions associated with the technical issue; detecting that a solution within the ordered list of solutions comprises executable remediation code associated with the technical issue; and executing the executable remediation code to remediate the technical issue.

In some embodiments, the computer-implemented method further comprises detecting a support request from a user associated with the user computing system; and presenting a graphical user interface on a display device of the user computing system, wherein the graphical user interface comprises one or more interface elements configured to receive additional input data from the user, the one or more interface elements comprising at least one of an image capture tool and a text entry field, wherein the search query further comprises the additional input data from the user, wherein the additional input data comprises at least one of an image capture and a character search string.

In some embodiments, the resolution database system is configured to perform a fuzzy algorithm-based image search within a resolution database based on the image capture.

In some embodiments, the resolution database system is configured to perform a keyword search within a resolution database based on the character search string.

In some embodiments, the computer-implemented method further comprises presenting the ordered list of solutions to a graphical user interface on a display device of the user computing system; and receiving a selection of the solution from a user associated with the user computing system, wherein executing the executable remediation code is based on receiving the selection of the solution from the user.

In some embodiments, executing the executable remediation code is performed automatically by the security agent.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the invention in general terms, reference will now be made to the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

"Entity" as used herein may refer to an individual or an organization that owns and/or operates an online system of networked computing devices, systems, and/or peripheral devices on which the system described herein is implemented. The entity may be a business organization, a non-profit organization, a government organization, and the like, which may routinely use various types of applications within its enterprise environment to accomplish its organizational objectives.

"Entity system" as used herein may refer to the computing systems, devices, software, applications, communications hardware, and/or other resources used by the entity to perform the functions as described herein. Accordingly, the entity system may comprise desktop computers, laptop computers, servers, Internet-of-Things ("IoT") devices, networked terminals, mobile smartphones, smart devices (e.g., smart watches), network connections, and/or other types of computing systems or devices and/or peripherals along with their associated applications.

"Computing system" or "computing device" as used herein may refer to a networked computing device within the entity system. The computing system may include a processor, a non-transitory storage medium, a communications device, and a display. The computing system may be configured to support user logins and inputs from any combination of similar or disparate devices. Accordingly, the computing system may be a portable electronic device such as a smartphone, tablet, single board computer, smart device, or laptop. In other embodiments, the computing system may be a stationary unit such as a personal desktop computer, networked terminal, IoT device, or the like.

"User" as used herein may refer to an individual who may interact with the entity system to access the functions therein. Accordingly, the user may be an agent, employee, associate, contractor, or other authorized party who may access, use, administrate, maintain, and/or manage the computing systems within the entity system. In other embodiments, the user may be a client or customer of the entity.

Accordingly, the term "user device" or "mobile device" may refer to mobile phones, personal computing devices, tablet computers, wearable devices, and/or any stationary or portable electronic device capable of receiving and/or storing data therein.

"Graph database" as used herein may refer to a database wherein functional data units are stored as "nodes" or "vertices" that are connected to one another via "edges" or "lines" which establish certain defined relationships between vertices. In some embodiments, the vertices and/or edges may be associated with one or more "properties" which further add descriptive information to the vertices and/or edges.

"Fuzzy matching" or "fuzzy searching" as used herein may refer to a search algorithm for searching for data (e.g., within a database) and identifying search entries that may be potentially relevant to a query based on certain patterns rather than an exact match with the search query. In this regard, fuzzy searching may allow for the identification of potentially relevant results based on a search query containing a variety of different types of data (e.g., text strings, system state data, keystrokes, mouse or touch inputs, screenshots, and the like).

Embodiments of the present disclosure provide a system for efficiently and expediently resolving technical issues within a computing system in an entity's network environment. For instance, during the course of operating a computer system, a user may experience such technical issues as software glitches or crashes, system instability, unresponsive applications, unexpected or unintentional application behavior, or the like. Accordingly, a software-based automated security agent may be installed on the user computing system. The security agent may continuously generate a log of various types of information about the user computing system, such as key strokes, mouse or touch inputs, system states, installed applications and/or stored data, network traffic (e.g., data sent and/or received), system events, and the like.

The security agent may be communicatively coupled by an application programming interface ("API") layer to a resolution database, where the resolution database may comprise various types of data relating to the resolution of technical issues that may arise in the computing and/or networking context. In this regard, the resolution database may comprise executable code, scripts or macros, software updates and/or patches, support articles, or the like that relate to the resolution of a variety of technical issues such as the user-related issues as described above. In some embodiments, the resolution database may further comprise data relating to the resolution of entity-specific enforcement of technology rules or policies (e.g., data security policies, device usage policies, geographic restrictions, or the like).

In some embodiments, the information within the resolution database may be structured as a graph database wherein issues and resolutions are stored as nodes and the relationships between the nodes may establish the relevance of a particular solution to a particular issue. In this regard, the relationships between an issue and various solutions may be numerically weighted according to relevance (e.g., a scale between 0 to 1, where 0 is not relevant and 1 is most relevant).

The security agent may be configured to establish an API connection to the resolution database and execute a search based at least partly on the information captured within the log of the user computing system. In some embodiments, the security agent may be called on demand by the user upon encountering a technical issue within the user computing system. In other embodiments, the security agent may automatically execute its queries on a periodic basis using the log of the user computing system. In some embodiments, the security agent may submit a multi-dimensional search query (or multiple search queries) based on the different types of information that may be found in the log. For instance, the security agent may run queries based on system state data, screenshot captures, and a keyword query provided by the user. By running multiple searches along various different dimensions, the system may provide a higher probability of producing a relevant solution to the technical issue in an expedient manner. Based on the initial search query from the security agent, the resolution database may produce a ranked list of solutions to a particular technical issue to be processed by the user and/or the security agent. In this regard, the system may determine relevance using a variety of different processes depending on the nature of the search query. For instance, the system may use pattern analysis for queries based on images or screenshots while using computational linguistics for queries using search strings. The system may further use other algorithms or computations based on possibility theory, topological data analysis, or the like.

In some embodiments, the user may be authorized to view the ranked list of solutions and select the solutions most applicable to the user's technical issue. In other embodiments, the list may automatically be transmitted to a remediation engine which may automatically implement one or more solutions to the technical issue. For instance, the remediation engine may, in response to detecting that the technical issue is associated with outdated software (e.g., out of date kernel version, application, antivirus definitions, or the like), the remediation engine may automatically apply an update without any required input from the user.

The following exemplary use cases are provided for illustrative purposes only and are not intended to restrict the scope of the disclosure. In one exemplary embodiment, a user may encounter a technical issue in which an application returns an error message and cannot be executed as expected. The user may call the software-based security agent (e.g., by a keystroke) which may then present a graphical interface to the user, where the graphical interface may be configured to allow the user to provide inputs with respect to the technical issue. For instance, the graphical interface may comprise an interface element (e.g., button, selectable area, or the like) which may allow the user to take a screenshot of the user's screen while operating the user computing system. In some embodiments, the interface element may include a screen capture lasso function which may allow the user to select a specific area of the user's screen to be used in generating the search query. Continuing the above example, the user may use the lasso function to select the error message returned by the non-functioning application. The graphical interface may further comprise a text entry interface element (e.g., text entry field, on-screen keyboard, or the like) which may allow the user to input a search string (e.g., keywords, Boolean expressions, sentences in natural language, or the like). For instance, the user may provide the error message and/or code returned by the non-functioning application.

The security agent may create an API-based connection to the resolution database (e.g., through a web portal or the like) and transmit a search query comprising the image, search string, and/or the system log data associated with the user computing system. Based on the algorithms and fuzzy classification as described above, the resolution database may return an ordered list of search results comprising a list of potential solutions to the user's technical issue. The ordered list may be presented to the user via the security agent and/or a web interface accessible by the user. The user may then select one or more solutions from the search results (e.g., by clicking or touching an item within the search results) which may automatically execute the solution to resolve the technical issue. Continuing the above example, the user may select a solution comprising a software hotfix to the error message encountered by the user. Upon selecting the solution, the security agent may automatically apply the hotfix.

In another exemplary embodiment, the security agent may continuously generate system logs of the user computing system over a period of time. Based on the system log, the security agent may detect a potential issue relating to unauthorized activity within the user computing system. For example, the user computing system may be storing certain types of confidential data that the user computing system is not authorized to store. In other scenarios, the user computing system may be transmitting data to unauthorized computing systems outside of the entity's network. Accordingly, the security agent may, based on the user activity, execute a search in the resolution database for solutions regarding the potentially unauthorized user activity. In such embodiments, the resolution database may further comprise certain criteria for determining whether the activity is unauthorized (e.g., information about security policies). Upon detecting a search result indicating that the user activity is unauthorized, the security agent may automatically execute a solution associated with the unauthorized activity (e.g., back up and delete the confidential data from the user computing system).

The system as described herein confers a number of technological advantages over conventional computer support systems. In particular, by using fuzzy search algorithms, the system may execute a multidimensional search, which in turn increases the efficiency of the search process and increases the probability of producing relevant solutions to technical issues. Furthermore, by using the security agent as described herein, the system may automatically resolve issues as they arise with minimal or no input required from the user. In turn, this increases the usability of the computing system for the user while increasing the security of the computing systems within the network by automatically enforcing network and/or data based security policies.

Figure 1:
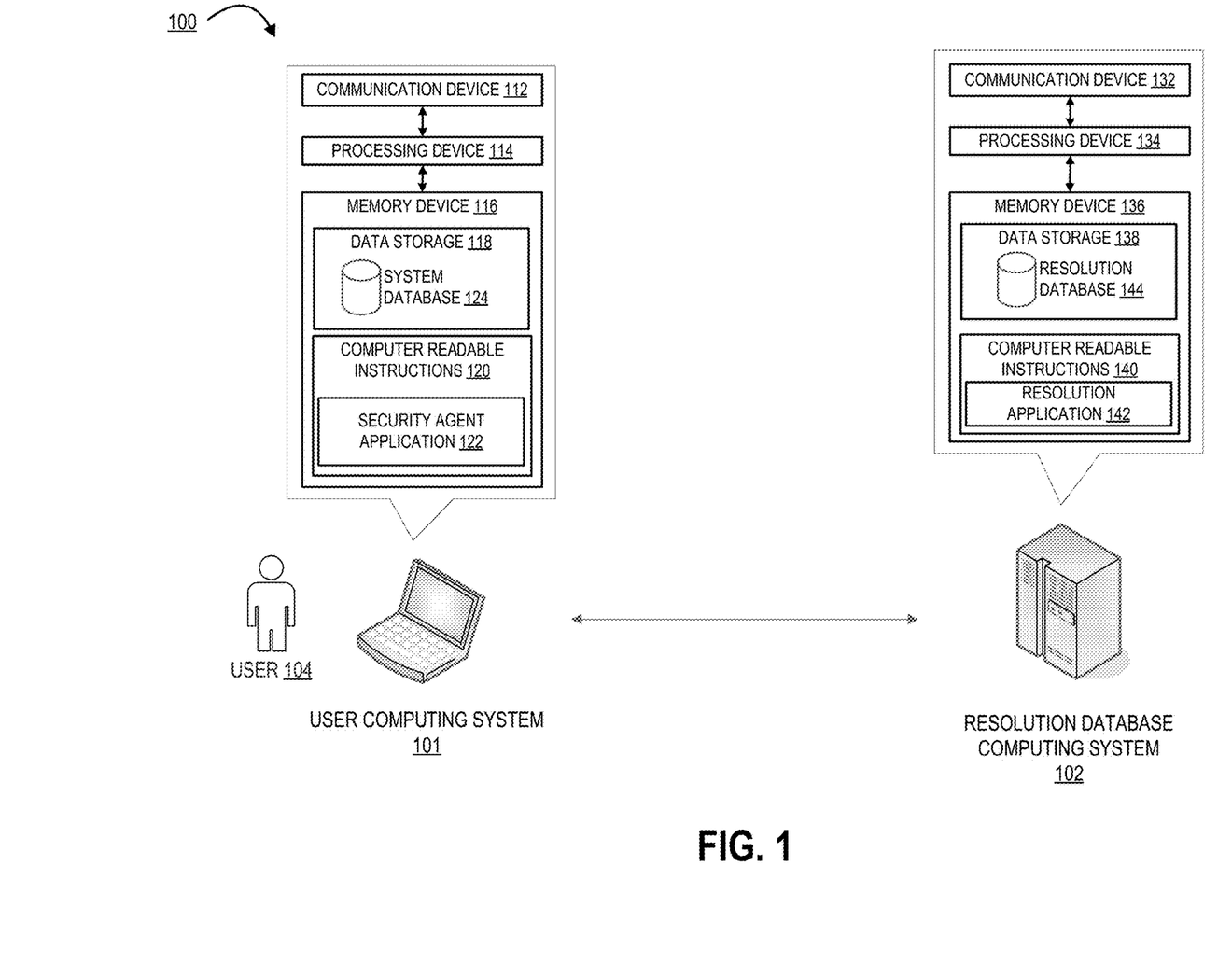
FIG. 1 illustrates an operating environment for the technical issue resolution system, in accordance with one embodiment of the present disclosure.

Turning now to the figures, FIG. 1 illustrates an operating environment 100 for the technical issue resolution system, in accordance with one embodiment of the present disclosure. In particular, FIG. 1 illustrates a user computing system 101 that is operatively coupled, via a network, to a resolution database computing system 102. In such a configuration, the user computing system 101 may transmit information to and/or receive information from the resolution database computing system 102. It should be understood that FIG. 1 illustrates only an exemplary embodiment of the operating environment 100, and it will be appreciated that the operating environment 100 may comprise a fewer or greater number of computing systems and/or devices than are depicted in FIG. 1. For example, though the FIG. 1 depicts a single user computing system 101, the operating environment 100 may comprise multiple user computing systems within the network environment. It should also be understood that one or more functions of the systems, devices, or servers as depicted in FIG. 1 may be combined into a single system, device, or server. For instance, in some embodiments, some of the functions of the resolution database computing system 102 may be executed by the user computing system 101. Conversely, in some embodiments, some of the functions of the user computing system 101 may be executed by the resolution database computing system 102. Furthermore, a single system, device, or server as depicted in FIG. 1 may represent multiple systems, devices, or servers. For instance, though the resolution database computing system 102 is depicted as a single unit, the functions of the resolution database computing system 102 may be distributed across multiple computing systems.

The network may be a system specific distributive network receiving and distributing specific network feeds and identifying specific network associated triggers. The network include one or more cellular radio towers, antennae, cell sites, base stations, telephone networks, cloud networks, radio access networks (RAN), WiFi networks, or the like. Additionally, the network may also include a global area network (GAN), such as the Internet, a wide area network (WAN), a local area network (LAN), or any other type of network or combination of networks. Accordingly, the network may provide for wireline, wireless, or a combination wireline and wireless communication between devices on the network.

As illustrated in FIG. 1, the user computing system 101 may be a computing device which may be monitored by the system for the purpose of resolving technical issues. Accordingly, the user computing system 101 may be a computing system that is operated by a user 104, such as an administrator, agent, or employee of the entity. Accordingly, the user computing system 101 may be a device such as a desktop computer, laptop, IoT device, smartphone, tablet, single-board computer, or the like. The user computing system 101 may comprise a user interface comprising one or more input devices (e.g., a keyboard, keypad, microphone, mouse, tracking device, biometric readers, capacitive sensors, or the like) and/or output devices (e.g., a display such as a monitor, projector, headset, touchscreen, and/or auditory output devices such as speakers, headphones, or the like).

As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 114 uses the communication device 112 to communicate with the network and other devices on the network, such as, but not limited to the resolution database computing system 102. The communication device 112 generally comprises a modem, antennae, WiFi or Ethernet adapter, radio transceiver, or other device for communicating with other devices on the network.

The computer-readable instructions 120 may comprise a security agent application 122, which may comprise computer-executable program code which may instruct the processing device 114 to perform certain logic, data processing, and data storing functions of the application to accomplish the entity's objectives. For instance, the security agent application 122 may be a software-based agent that continuously monitors various parameters associated with the user computing system 101, such as system state, user activity, network traffic, installed applications, hardware configuration, and the like. The security agent application 122 may further be configured to communicate with the resolution database computing system 102 through an API-based interaction.

In some embodiments, the memory device 116 includes data storage 118 for storing data related to the system environment. In this regard, the data storage 118 may comprise a system database 124. The system database 124 may comprise system logs saved by the security agent application 122 as a result of monitoring the user computing system 101. According, the system database 124 may continuously be updated by the security agent application 122 to reflect the state of the user computing system 101 at various points in time. The information within the system logs may at least partially be used in generating search queries to be transmitted to the resolution database computing system 102.

As further illustrated in FIG. 1, the operating environment 100 may further comprise a resolution database computing system 102 in operative communication with the user computing system 101. The resolution database computing system 102 may be configured to receive search queries from the security agent application 122 of the user computing system 101 and return ordered or ranked search results based on the search query. Accordingly, the resolution database computing system 102 may comprise a processing device 134 operatively coupled to a communication device 132 and a memory device 136 having data storage 138 and computer readable instructions 140 stored thereon.

The data storage 138 of the resolution database computing system 102 may comprise a resolution database 144. The resolution database 144 may include various types of support entries relating to the resolution of technical issues. Accordingly, the resolution database 144 may comprise entries for various technical issues as well as various solutions to such technical issues in the form of executable scripts or macros, executable code, software updates, support articles, or the like. The resolution database 144 may further comprise information regarding entity-specific operational rules (e.g., device usage and/or data security rules) along with one or more criteria for compliance with such rules. In some embodiments, the resolution database 144 may be a graph database. For instance, technical issues and their corresponding solutions may be stored as nodes, where the various nodes are defined by one or more relationships. Similarly, operational rules and their associated criteria may be stored as nodes defined by one or more relationships.

The computer readable instructions 140 may comprise a resolution application 142 that may be configured to use various types of search algorithms to search the information within the resolution database 144 based on the query provided by the security agent application 122. The resolution application 142 may further provided an ordered list of search results, where the list may be ordered based on relevance of the solutions to the particular technical issue to be resolved.

The communication devices as described herein may comprise a wireless local area network (WLAN) such as WiFi based on the Institute of Electrical and Electronics Engineers' (IEEE) 802.11 standards, Bluetooth short-wavelength UHF radio waves in the ISM band from 2.4 to 2.485 GHz or other wireless access technology. Alternatively or in addition to the wireless interface, the computing systems may also include a communication interface device that may be connected by a hardwire connection to the resource distribution device. The interface device may comprise a connector such as a USB, SATA, PATA, SAS or other data connector for transmitting data to and from the respective computing system.

The computing systems described herein may each further include a processing device communicably coupled to devices as a memory device, output devices, input devices, a network interface, a power source, a clock or other timer, a camera, a positioning system device, a gyroscopic device, one or more chips, and the like.

In some embodiments, the computing systems may access one or more databases or datastores (not shown) to search for and/or retrieve information related to the service provided by the entity. The computing systems may also access a memory and/or datastore local to the various computing systems within the operating environment 100.

The processing devices as described herein may include functionality to operate one or more software programs or applications, which may be stored in the memory device. For example, a processing device may be capable of operating a connectivity program, such as a web browser application. In this way, the computing systems may transmit and receive web content, such as, for example, product valuation, service agreements, location-based content, and/or other web page content, according to a Wireless Application Protocol (WAP), Hypertext Transfer Protocol (HTTP), and/or the like.

A processing device may also be capable of operating applications. The applications may be downloaded from a server and stored in the memory device of the computing systems. Alternatively, the applications may be pre-installed and stored in a memory in a chip.

The chip may include the necessary circuitry to provide integration within the devices depicted herein. Generally, the chip will include data storage which may include data associated with the service that the computing systems may be communicably associated therewith. The chip and/or data storage may be an integrated circuit, a microprocessor, a system-on-a-chip, a microcontroller, or the like. In this way, the chip may include data storage. Of note, it will be apparent to those skilled in the art that the chip functionality may be incorporated within other elements in the devices. For instance, the functionality of the chip may be incorporated within the memory device and/or the processing device. In a particular embodiment, the functionality of the chip is incorporated in an element within the devices. Still further, the chip functionality may be included in a removable storage device such as an SD card or the like.

A processing device may be configured to use the network interface to communicate with one or more other devices on a network. In this regard, the network interface may include an antenna operatively coupled to a transmitter and a receiver (together a "transceiver"). The processing device may be configured to provide signals to and receive signals from the transmitter and receiver, respectively. The signals may include signaling information in accordance with the air interface standard of the applicable cellular system of the wireless telephone network that may be part of the network. In this regard, the computing systems may be configured to operate with one or more air interface standards, communication protocols, modulation types, and access types. By way of illustration, the devices may be configured to operate in accordance with any of a number of first, second, third, fourth, and/or fifth-generation communication protocols and/or the like. For example, the computing systems may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, with fifth-generation (5G) wireless communication protocols, or the like. The devices may also be configured to operate in accordance with non-cellular communication mechanisms, such as via a wireless local area network (WLAN) or other communication/data networks.

The network interface may also include an application interface in order to allow a user or service provider to execute some or all of the above-described processes. The application interface may have access to the hardware, e.g., the transceiver, and software previously described with respect to the network interface. Furthermore, the application interface may have the ability to connect to and communicate with an external data storage on a separate system within the network.

The devices may have an interface that includes user output devices and/or input devices. The output devices may include a display (e.g., a liquid crystal display (LCD) or the like) and a speaker or other audio device, which are operatively coupled to the processing device. The input devices, which may allow the devices to receive data from a user, may include any of a number of devices allowing the devices to receive data from a user, such as a keypad, keyboard, touch-screen, touchpad, microphone, mouse, joystick, other pointer device, button, soft key, and/or other input device(s).

The devices may further include a power source. Generally, the power source is a device that supplies electrical energy to an electrical load. In some embodiment, power source may convert a form of energy such as solar energy, chemical energy, mechanical energy, or the like to electrical energy. Generally, the power source may be a battery, such as a lithium battery, a nickel-metal hydride battery, or the like, that is used for powering various circuits, e.g., the transceiver circuit, and other devices that are used to operate the devices. Alternatively, the power source may be a power adapter that can connect a power supply from a power outlet to the devices. In such embodiments, a power adapter may be classified as a power source "in" the devices.

As described above, the computing devices as shown in FIG. 1 may also include a memory device operatively coupled to the processing device. As used herein, "memory" may include any computer readable medium configured to store data, code, or other information. The memory device may include volatile memory, such as volatile Random Access Memory (RAM) including a cache area for the temporary storage of data. The memory device may also include non-volatile memory, which can be embedded and/or may be removable. The non-volatile memory may additionally or alternatively include an electrically erasable programmable read-only memory (EEPROM), flash memory or the like.

The memory device may store any of a number of applications or programs which comprise computer-executable instructions/code executed by the processing device to implement the functions of the devices described herein.

The computing systems may further comprise a gyroscopic device. The positioning system, input device, and the gyroscopic device may be used in correlation to identify phases within a service term.

Each computing system may also have a control system for controlling the physical operation of the device. The control system may comprise one or more sensors for detecting operating conditions of the various mechanical and electrical systems that comprise the computing systems or of the environment in which the computing systems are used. The sensors may communicate with the processing device to provide feedback to the operating systems of the device. The control system may also comprise metering devices for measuring performance characteristics of the computing systems. The control system may also comprise controllers such as programmable logic controllers (PLC), proportional integral derivative controllers (PID) or other machine controllers. The computing systems may also comprise various electrical, mechanical, hydraulic or other systems that perform various functions of the computing systems. These systems may comprise, for example, electrical circuits, motors, compressors, or any system that enables functioning of the computing systems.

Figure 2:
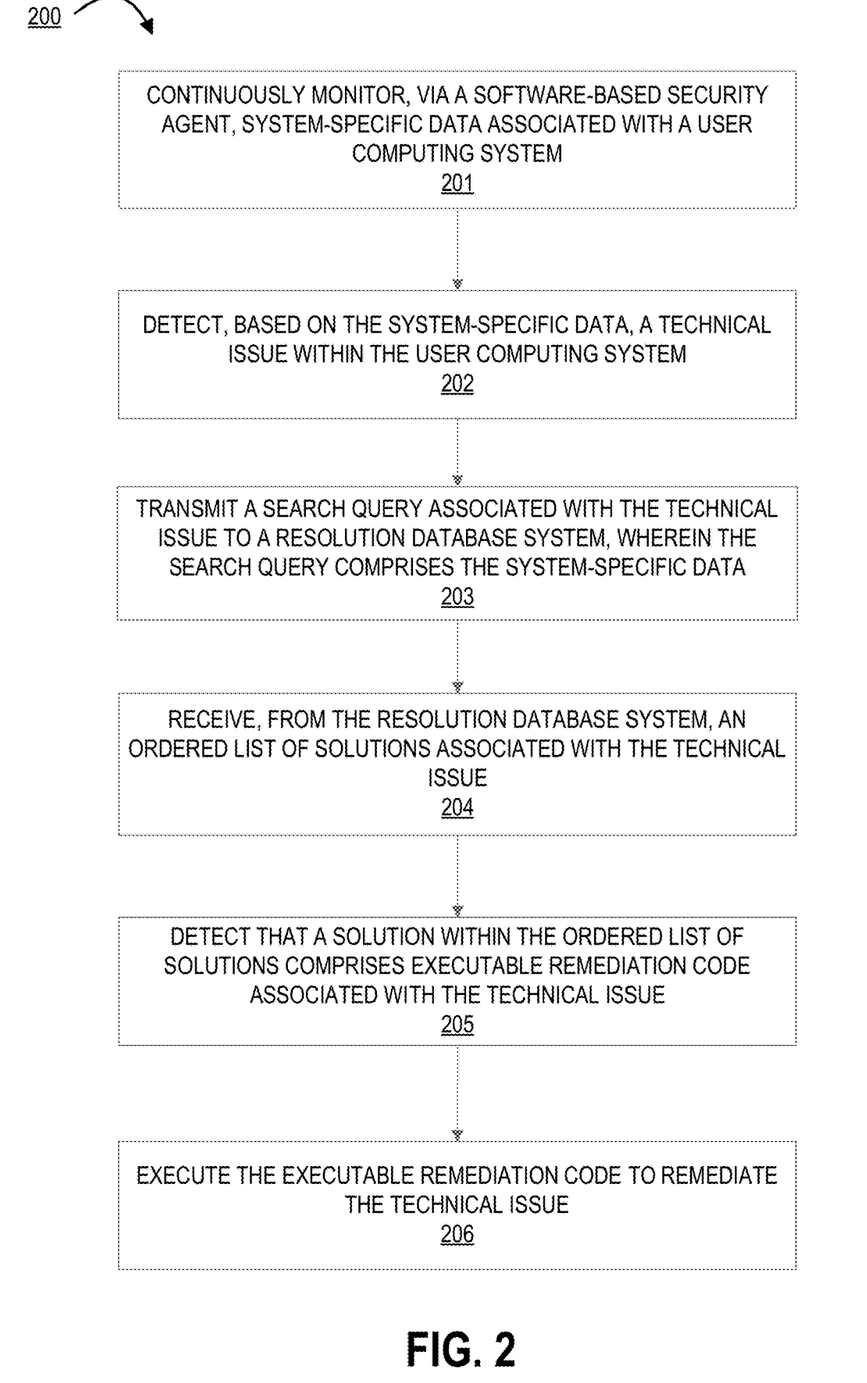
FIG. 2 illustrates a process flow for resolving technical issues using an automated security agent and a resolution database, in accordance with some embodiments of the present disclosure.

FIG. 2 illustrates a process flow 200 for resolving technical issues using an automated security agent and a resolution database, in accordance with some embodiments. The process begins at block 201, where the system continuously monitors, via a software-based security agent, system-specific data associated with a user computing system. The software-based security agent may be deployed and/or instantiated on the user computing system such that the security agent is configured to hook into the process command loop of the user computing system. Accordingly, the security agent may be authorized and configured to monitor various types of system data associated with the user computing system. Examples of such system data may include user inputs and/or behaviors, installed software and/or applications, key strokes, mouse or touch inputs, network traffic, system states, system alerts or exceptions, operating system/kernel versions, or the like.

The process continues to block 202, where the system detects, based on the system-specific data, a technical issue within the user computing system. In some embodiments, detecting the technical issue may comprise detecting a resolution request from a user regarding the technical issue. In this regard, the user may execute the security agent (e.g., by selecting an icon associated with the security agent, entering a shortcut key or key combination, or the like) upon encountering a technical issue with the user computing system. In such scenarios, the technical issue may be, for instance, an application failure, driver error, hardware malfunction, system or application instability, application bugs or crashes, error messages, or the like.

In some embodiments, the security agent may, when executed, cause a graphical interface to be presented on a display of the user computing system. The graphical interface may comprise various interface elements that allow the user to provide additional data to be used in resolving the technical issue. For instance, the interface elements may comprise a screenshot and/or lasso tool which may allow the user to capture an image of at least a portion of the user's screen. The user may generate such an image to provide additional context to the technical issue. For instance, a user may be experiencing issues with graphical artifacts appearing on the screen. By capturing the artifacts in an image, the system may be able to search for solutions based on the appearance of the artifacts (e.g., by pattern recognition, machine learning, and the like). In other embodiments, the interface elements may comprise a field which may allow the user to enter text relating to the technical issue (e.g., a natural language query or Boolean search). In this regard, the user may enter in keywords related to the user's issue (e.g., "green artifacts appearing on screen").

In other embodiments, the security agent may automatically detect technical issues based on the system-specific data. For instance, the security agent may detect the presence of an application that is potentially not authorized to be installed on the user computing system (e.g., the application may be against the entity's policy). In other embodiments, the security agent may detect, based on the user's keystrokes, that the user is potentially transmitting confidential information to an external, unauthorized third party.

The process continues to block 203, where the system transmits a search query associated with the technical issue to a resolution database system, wherein the search query comprises the system-specific data. The security agent may, in some embodiments, further construct the search query based on additional information provided by the user. In this regard, the search query may further comprise data such as search strings, image captures, and the like, in addition to the system-specific data logged by the security agent. The security agent may be configured to communicate with the resolution database system via an API call (e.g., through a web-based interaction or portal).

Once the resolution database system receives the search query, the system may use fuzzy classification and pattern recognition to identify the elements within the search query and identify potential matches based on the elements. In this regard, the search query may be a multidimensional query intended to provide various different perspectives on the technical issue. For instance, the system may use artificial intelligence and/or pattern recognition to compare the captured image within the search query to various other images associated with various technical issues within the resolution database. The system may further use language or keyword related algorithms to identify potential solutions. In addition, the system may compare the system-specific data to stored system-specific data that may relate to the technical issues identified within the resolution database.

In some embodiments, the system may continuously log historical data regarding past search queries received from all of the users within the network environment. In this regard, the system may further track and classify technical issues encountered by other users. The system may then provide recommendations of certain solutions based on detecting that other users have selected such solutions to address their technical issues. For example, the system may detect that previous users have also experienced a screen artifact issue, and further detect that the users have selected to deploy a particular solution (e.g., a graphics driver update). Accordingly, the system may place a higher weight on certain solutions based on historical activity.

The process continues to block 204, where the system receives, from the resolution database system, an ordered list of solutions associated with the technical issue. The solutions may be ordered by relevance, where relevance may be calculated through various fuzzy search algorithms as described elsewhere herein. In some embodiments, the system may be configured to present the ordered list of solutions on the graphical display of the user computing system. In such embodiments, each solution within the ordered list may be interactable by the user such that the user may select the most appropriate solution for the technical issue. In other embodiments, the ordered list may be accessible by the security agent such that the security agent may automatically select and implement the most appropriate solution.

The process continues to block 205, where the system detects that a solution within the ordered list of solutions comprises executable remediation code associated with the technical issue. The executable remediation code may be, for instance, an executable script or macro, a new application or application update, driver updates, new antivirus definitions, patches or hotfixes, or the like which may be executed to resolve the technical issue on the user computing system. In such embodiments, the solutions may be displayed on the graphical interface and comprise information about the nature of the executable remediation code. For example, the solution may include a description of the executable remediation code along with usage or installation instructions.

In other embodiments, if the technical issue is a possible unauthorized use of the user computing system (e.g., an unauthorized installation of an application), the security agent may evaluate the use along certain criteria set by the entity. In this regard, the criteria may include information about application blocklists/allowlists, application or function usage restrictions, data security requirements, and the like. Upon detecting that the technical issue is indeed an unauthorized use, the security agent may select a solution comprising executable code for automatically remediating the unauthorized use.

The process concludes at block 206, where the system executes the executable remediation code to remediate the technical issue. In some embodiments, the user may execute the executable code by selecting a solution and opening the executable code on the user computing system. Continuing the above example, the user may select a solution to download a driver update for the user computing system and subsequently install the driver update to resolve the graphical artifact issue. In other embodiments, the security agent may automatically execute the executable remediation code. In some embodiments, the security agent may further cause a notification to appear on the graphical interface of the user computing system, where the notification indicates that a technical issue has been automatically resolved by the security agent. In other embodiments, the security agent may silently execute the executable remediation code without notifying the user. In this way, the system may provide an expedient way to resolve technical issues that may arise within computing systems across the entire network environment.

Each communication interface described herein generally includes hardware, and, in some instances, software, that enables the computer system, to transport, send, receive, and/or otherwise communicate information to and/or from the communication interface of one or more other systems on the network. For example, the communication interface of the user input system may include a wireless transceiver, modem, server, electrical connection, and/or other electronic device that operatively connects the user input system to another system. The wireless transceiver may include a radio circuit to enable wireless transmission and reception of information.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EEPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for resolution of technical issues using computing system-specific contextual data, the system comprising:
    a memory device with computer-readable program code stored thereon;
    a communication device; and
    a processing device operatively coupled to the memory device and the communication device, wherein the processing device is configured to execute the computer-readable program code to:
        continuously monitor, via a software-based security agent, system-specific data associated with a user computing system;
        detect, based on the system-specific data, a technical issue within the user computing system;
        transmit a multidimensional search query associated with the technical issue to a resolution database system, wherein the multidimensional search query is based on the system-specific data, at least one screenshot capture from the user computing system, and at least one keyword query submitted by the user;
        receive, from the resolution database system, an ordered list of solutions associated with the technical issue;
        detect that a solution within the ordered list of solutions comprises executable remediation code associated with the technical issue; and execute the executable remediation code to remediate the technical issue.

2. The system according to claim 1, wherein the computer-readable program code further causes the processing device to:
present the ordered list of solutions to a graphical user interface on a display device of the user computing system; and
receive a selection of the solution from a user associated with the user computing system, wherein executing the executable remediation code is based on receiving the selection of the solution from the user.

3. The system according to claim 1, wherein executing the executable remediation code is performed automatically by the security agent.

4. The system according to claim 1, wherein the system-specific data comprises at least one of system alerts, keystrokes, and system state information.

5. The system according to claim 1, wherein the technical issue is one of an application error, a software crash, or system instability.

6. The system according to claim 1, wherein the technical issue is unauthorized activity on the user computing system.

7. A computer program product for resolution of technical issues using computing system-specific contextual data, the computer program product comprising at least one non-transitory computer readable medium having computer-readable program code portions embodied therein, the computer-readable program code portions comprising executable code portions for:
continuously monitoring, via a software-based security agent, system-specific data associated with a user computing system;
detecting, based on the system-specific data, a technical issue within the user computing system;
transmitting a multidimensional search query associated with the technical issue to a resolution database system, wherein the multidimensional search query is based on the system-specific data, at least one screenshot capture from the user computing system, and at least one keyword query submitted by the user;
receiving, from the resolution database system, an ordered list of solutions associated with the technical issue;
detecting that a solution within the ordered list of solutions comprises executable remediation code associated with the technical issue; and
executing the executable remediation code to remediate the technical issue.

8. The computer program product according to claim 7, wherein the computer-readable code portions further comprise executable code portions for:
presenting the ordered list of solutions to a graphical user interface on a display device of the user computing system; and
receiving a selection of the solution from a user associated with the user computing system, wherein executing the executable remediation code is based on receiving the selection of the solution from the user.

9. A computer-implemented method for resolution of technical issues using computing system-specific contextual data, wherein the computer-implemented method comprises:
continuously monitoring, via a software-based security agent, system-specific data associated with a user computing system;
detecting, based on the system-specific data, a technical issue within the user computing system;
transmitting a multidimensional search query associated with the technical issue to a resolution database system, wherein the multidimensional search query is based on the system-specific data, at least one screenshot capture from the user computing system, and at least one keyword query submitted by the user;
receiving, from the resolution database system, an ordered list of solutions associated with the technical issue;
detecting that a solution within the ordered list of solutions comprises executable remediation code associated with the technical issue; and
executing the executable remediation code to remediate the technical issue.

10. The computer-implemented method according to claim 9, wherein the computer-implemented method further comprises:
presenting the ordered list of solutions to a graphical user interface on a display device of the user computing system; and
receiving a selection of the solution from a user associated with the user computing system, wherein executing the executable remediation code is based on receiving the selection of the solution from the user.

11. The computer-implemented method according to claim 9, wherein executing the executable remediation code is performed automatically by the security agent.

* * * * *